United States Patent [19]

Masuda et al.

[11] Patent Number: 4,780,872
[45] Date of Patent: Oct. 25, 1988

[54] REMOTE SUPERVISORY AND CONTROLLING SYSTEM

[75] Inventors: Toshiyuki Masuda, Matsuzaka; Osamu Yamada, Hirakata; Akihiko Hamada, Shijonawate; Masayuki Kanaya, Matsuzaka, all of Japan

[73] Assignee: Matsushita Electric Works, Ltd., Osaka, Japan

[21] Appl. No.: 929,379

[22] Filed: Nov. 12, 1986

[30] Foreign Application Priority Data

Nov. 25, 1985 [JP] Japan .................................. 60-264206

[51] Int. Cl.$^4$ ........................... H04Q 1/00; H04J 3/24
[52] U.S. Cl. .................................. 370/92; 340/825.52
[58] Field of Search ...................... 370/94, 92, 90, 96; 340/825.52, 825.07

[56] References Cited

U.S. PATENT DOCUMENTS

| 4,429,299 | 1/1984 | Kabat et al. ..................... 340/825.52 |
| 4,574,376 | 3/1986 | Dahlquist ....................... 340/825.52 |
| 4,608,561 | 8/1986 | Kosima et al. ................. 340/825.52 |
| 4,628,315 | 12/1986 | Douglas ........................ 340/825.52 |

Primary Examiner—Douglas W. Olms
Attorney, Agent, or Firm—Burns, Doane, Swecker & Mathis

[57] ABSTRACT

A remote supervisory and controlling system in which a central control unit generates a dummy transmission signal until receipt of an interruption signal from one of a plurality of input terminal units. In response to the interruption signal, the control limit accesses the input terminal generating the interruption signal, which returns its input data.

5 Claims, 11 Drawing Sheets

REMOTE SUPERVISORY AND CONTROLLING SYSTEM

TECHNICAL BACKGROUND OF THE INVENTION

This invention relates to remote supervisory and controlling systems and, more particularly, to a system for remotely supervising and controlling respectively a plurality of operating, monitoring and controlling terminal units connected through a two-wire signal line to a central control unit for time-divisional multiplex transmission between them of input and control data.

The remote supervisory and controlling system of the type referred to can provide central control of a plurality of operating and monitoring terminal units (which are also referred to as "input terminal units"). It can also control a plurality of control terminal units, so that the system can be effectively utilized in controlling, for example, many loads such as luminaire, detectors and the like connected to a plurality of input terminal units located at various positions in a multi-storied building from a remote control room therein.

DISCLOSURE OF PRIOR ART

Generally, in carrying out remote supervision and control, it is possible to utilize a load control system employing a time-divisional multiplex transmission such as disclosed in, for example, U.S. Pat. No. 4,608,561 to Y. Kojima et al. This patent shows an arrangement wherein a plurality of terminal units are connected to a central control unit for their two-way free control in both an automatic and manual manner. This arrangement may be advantageously utilized for enhancing the freedom of control of the terminal units.

The automatic control by means of the central control unit is carried out, in this patent, in such a manner that the central control unit cyclically makes a sequential access to the terminal units so as to perform time-divisional multiplex transmission of input and control signal data. When the terminal units to be controlled by the central control unit are increased in number, however, there arises a problem that the response of the system is disadvantageously delayed depending on the timing of data input. For example, assuming that 128 of the terminal units are to be controlled by the central control unit and 128 channel addresses are set, sequential access has to be made from 1st to 128th channels. Thus, if the central control unit receives a data input from one of the input terminal units which corresponds to the first channel during the access to second channel, a required time T until the first channel is subjected to a next cycle access will be represented by $T=127To$, wherein To is an access time for each of the terminal units. Input data reception by the central control unit will therefore be significantly delayed. When, in particular, this remote supervisory and controlling system is used for centralized control of a large number of lighting devices in a multi-storied building in association, with intruder sensor incorporated as the monitoring terminal units for lighting one or more of the lighting devices in response to an abnormality signal from the sensors, there arises a risk that the required time for effecting illumination becomes too long for satisfactory operation.

TECHNICAL FIELD OF THE INVENTION

A primary object of the present invention is, therefore, to provide a remote supervisory and controlling system which can respond immediately to a data signal input, regardless of its timing, coming from operating and monitoring terminal units connected to a central control unit, for controlling a predetermined one or ones of the terminal units.

According to the present invention, the above object is realized by providing a remote supervisory and controlling system wherein a plurality of input and control terminal units each having a specific address set therefor are connected through a two-wire signal line to a central control unit. A time-divisional multiplex transmission of such various signals as address data signal for calling the terminal units, control data signal for controlling loads, input data signal from the terminal units and return wait signal for setting period of return signal from the terminal units is performed through the two-wire signal line. Each of the terminal units takes up the transmitted signals upon a coincidence in address data of the signal with the specific address data set for each terminal unit and returns its input data signal to the central control unit in synchronism with the return wait signal.

The central control unit comprises means for constantly providing a dummy transmission signal, and means responsive to an interruption signal from any input terminal unit for processing the interruption by making an access to the said terminal unit having generated the interruption signal to have the input data signal returned therefrom. The input terminal units comprise respectively means responsive to an input data for generating the interruption signal in synchronism with a start pulse signal of the dummy transmission signal and returning its specific address data signal in synchronism with the return wait signal of an addresss confirmation mode signal from the central control unit the input termnal units further comprise means responsive to an access mode transmission signal provided from the central control unit in response to the interruption signal for returning to the central control unit the input data signal corresponding to the input data. The entire arrangement is such that the control data signal to be transmitted to the control terminal unit is prepared on the basis of the input data signal returned from the input terminal unit to the central control unit.

BRIEF DESCRIPTION OF THE DRAWINGS

Other objects and advantages of the present invention shall be made clear in the following description of the invention detailed with reference to a preferred embodiment shown in accompanying drawings, in which.

DISCLOSURE OF PREFERRED EMBODIMENT

While the present invention shall now be described with reference to the preferred embodiment shown in the drawings, it should be understood that the intention is not to limit the invention only to the particular embodiment shown but rather to cover all alterations, modifications and equivalent arrangements possible within the scope of appended claims.

Figure 1:
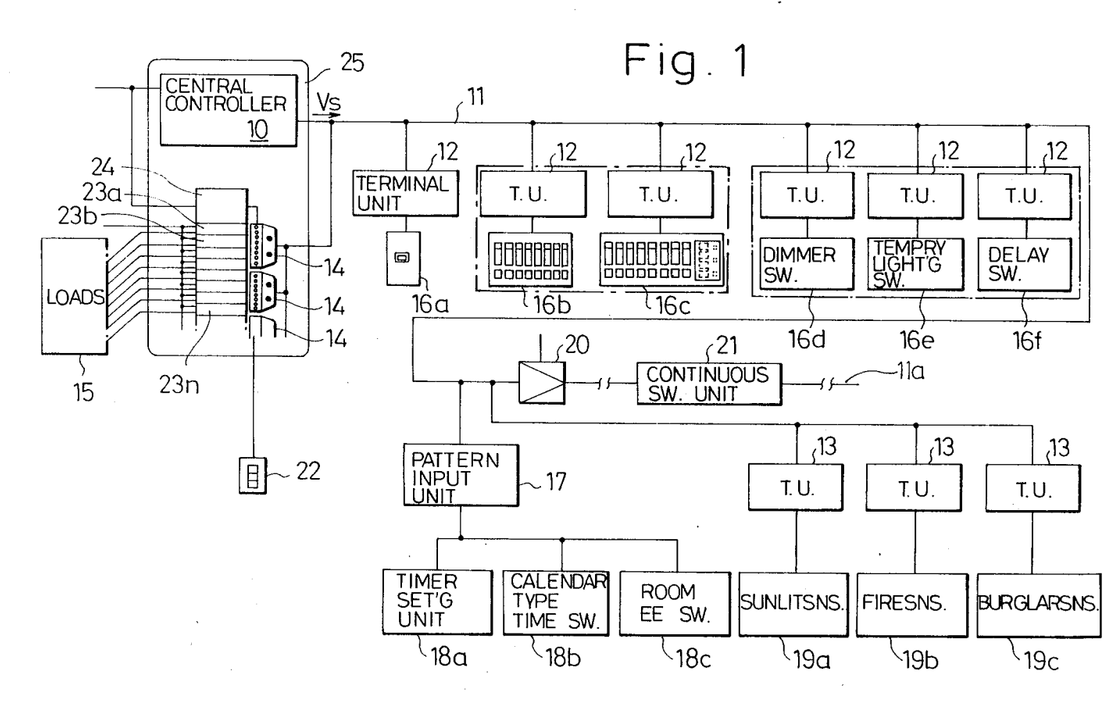
FIG. 1 schematially shows, partly in block diagram, a general arrangement of the remote supervisory and controlling system according to the present invention.
Figures 7A, 7B:
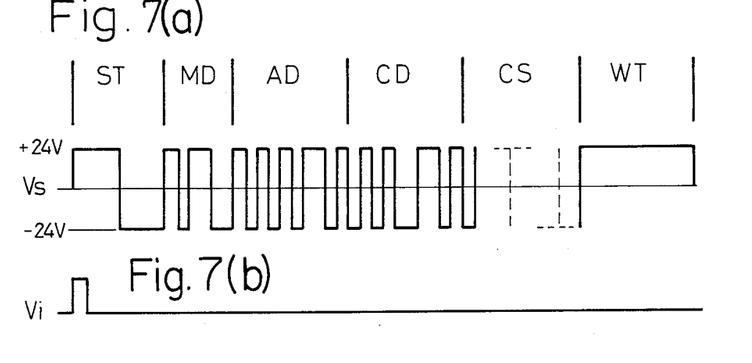
FIG. 7a is a waveform diagram of the dummy transmission signal constantly provided by the means therefor in the central control unit in the system of FIG. 1.
FIG. 7b is a waveform diagram of an example of the interrupt signal from the operating terminal unit in the system of FIG. 1.

Referring to FIG. 1, the remote supervisory and controlling system according to the present invention comprises generally a central control unit or central controller 10, a plurality of operating and monitoring (i.e., input) terminal units 12 and 13, and a plurality of controlling terminal units 14, all of which terminal units 12-14 were connected through a two-wire signal line 11. Each terminal unit has a specific preset address. The central control unit 10 comprises means for providing a dummy transmission signal Vs such as shown in FIG. 7(a) to the signal line 11,. This dummy transmission signal is a bipolar (±24 V) time-divisional multiplex transmission signal containing a start pulse signal ST indicative of the start of the transmission signal, a mode data signal MD indicative of signal mode, an address data signal AD for calling any one or ones of the terminal units 12, 13 and 14, a control data signal CD for controlling loads 15 connected to the system, a check sum data signal CS and a return wait signal WT for setting the period of a return signal from the terminal units 12, 13 and 14. Through provision of the dummy signal Vs, a signal of the described format is constantly provided from the unit 10 onto the line 11. Data transmission is performed through pulse-width modulation.

The central control unit 10 also comprises means responsive to an interruption signal Vi returned to the unit such as shown in FIG. 7(b) for processing an interruption by detecting whether and which one of the input terminal units 12 and 13 has generated the interruption signal and providing access to the detected terminal unit for having its input data returned therefrom to the control unit.

Each of the terminal units 12, 13 and 14 is arranged so that, when the address data signal AD of the dummy transmission signal Vs received through the signal line 11 by the terminal unit coincides with its specific address data, the terminal units takes up the control data signal CD of the transmission signal Vs and sends out an input data signal as a current mode signal (a signl provided by short-circuiting two wires of the signal line 11 with an interposition of a proper low impedance) in synchronism with the return wait signal WT. In particular, the input terminal units 12 and 13 comprise respectively an interruption signal generating means which is responsive to an occurrence of input data for generating the interrupt signal Vi in synchronism with the start pulse signal ST of the dummy signal transmission signal Vs and returning the specific address data to the central control unit 10 as an address confirmation mode for the address from the unit 10 in synchronism with the return wait signal WT, and means which is responsive to an interrupt-access mode transmission signal from the central control unit 10 for returning the data signal corresponding to the input data, so that the central control unit 10 can prepare the control data signal CD to be transmitted to the controlling terminal units 14 on the basis of the input data returned from the input terminal units 12 and 13 to the control unit 10.

When the loads 15 are a plurality of lighting devices, the operating terminal units 12 include operational input means such as separately operating switches 16a for controlling individual ones of the loads 15, a selector switch 16b for selectively partly controlling one or more of the loads 15, a pattern switch 16c for controlling the loads 15 collectively in a p redetermined pattern, a dimmer switch 16d for adjusting light intensity of the loads 15, a temporary lighting switch 16e for lighting the loads 15 temporarily, for example, for a period of 30 to 300 seconds, and a delay switch 16f for delaying the turning off of the loads 15 by a predetermined period, for example, of 30 to 300 seconds. As a separate input means, a set input unit 17 may be connected to the signal line 11, which input unit 17 is provided with a timer setting unit 18a, a calendar type time switch 18b, a room EE switch and the like, so that a sequence controlling input data can be selectively provided to the central control unit 10 in a predetermined pattern. The set input unit 17 may be regarded in a broad sense as one of the monitoring terminal units 13. Further, the monitoring terminal units 13 are connected to such monitoring input means as a sensor 19a for detecting sunlight, a fire sensor 19b for fire protection, a burglar or the like sensor 19c for crime prevention, and similar sensors.

A booster 20 for compensating for attenuation in the dummy transmission signal Vs is connected to the signal line 11, and a continuous switch 21 is connected as another terminal unit to the terminating end of the signal line 11, so that a second remote supervisory and controlling system (not shown) of the same specifications as the present system can be operatively coupled to the present system through the switch unit 21. A proper connection through switch unit 21 to the line 11 of a further two-wire signal line 11a for the second system makes it possible to enlarge the system to be of a vast scale for realizing a broader supervision and remote control.

The system of the present invention includes a remote control switch 22. The central switch 22 is intended to be near at the operator's hand for parallel use with the foregoing terminal switches. It provides a control output equivalent to that of the operating terminal units 12. The control outputs of the controlling terminal units 14 and remote control switch 22 are provided to remote control relays 23a, 23b, ... 23n which directly control the loads 15, the relays being controlled in parallel with one another for eventual parallel control of the respective loads 15 as required.

Figure 2:
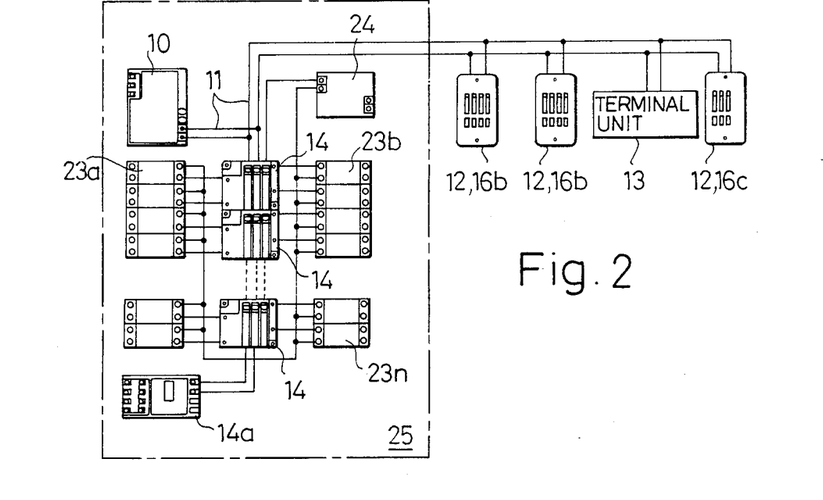
FIG. 2 shows a practical wiring example of the central control unit and respective operating, monitoring and controlling terminal units in the system of FIG. 1.

In the illustrated embodiment, the controlling terminal units 14 and relays 23a, 23b, ... 23n are supplied with electric power through a transformer 24. The central control unit 10, controlling terminal units 14, remote control relays 23a, 23b, ... 23n and transformer 24 are mounted on a control panel 25. Though the power supply and signal transmission lines are illustrated respectively by a single line in FIG. 1, the respective constituent members are connected with one another in a practice by a two-wire line such as shown in FIG. 2. Further, another control terminal unit 14a can be incorporated in the remote control relays as shown in FIG. 2. Input means other than those exemplified in the foregoing may be employed as the operating or monitoring terminal units 12 or 13 and, preferably, an input means is incorporated in the respective terminal units. While FIG. 1 shows that the switches, sensors and so on associated with the respective operating and monitoring terminal units 12 and 13 or the set input unit 17 are separately provided with respect to the units, it is preferable in practice to accommodate them within an integral casing, or a proper combination of a plurality of the terminal units and their associated switches or sensors may be housed in a single casing as shown in FIG. 1 as being enclosed in a chain-line frame.

Figure 10:
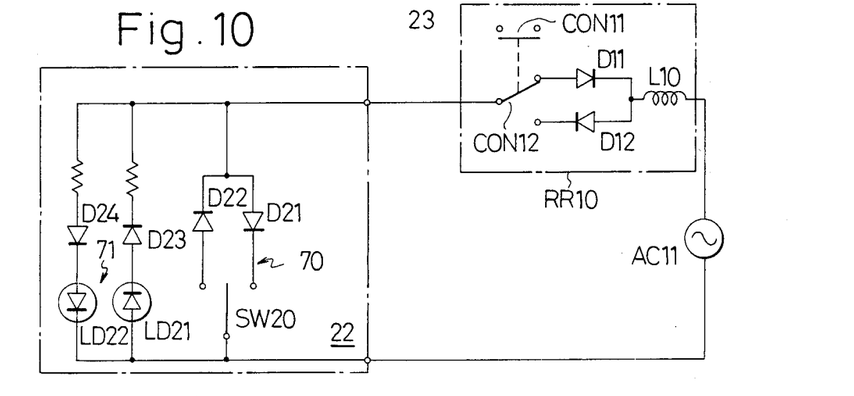
FIG. 10 is a circuit diagram showing an example of a remote control switch in the system of FIG. 1.
Figure 11:
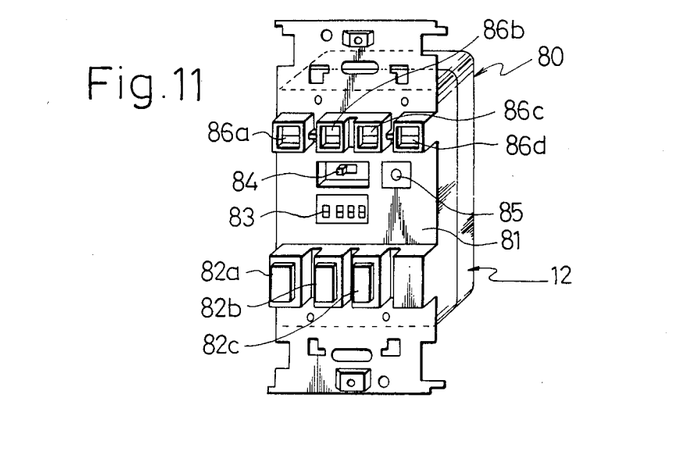
FIG. 11 is a perspective view showing in a practical example the operating terminal unit in the system of FIG. 1.

More definitely, the operating terminal unit 12, for example, it so provided that, as seen in FIG. 11, its casing 80 is mountable to a three-unit type metal fitting 81 for mounting thereto general wiring equipment, and is made to have the same dimensions as ordinary flush type wiring equipment for being mounted as housed in a flush box in similar manner to such equipment. In the illustrated case, three pattern switches 82a, 82b and 82c forming the switch SW20 of FIG. 10 and performing the same function as the pattern switch 16c of FIG. 1 are disposed in the lower part of the front side of the casing 80, and an address setting switch 83 comprising a dip switch for setting the lower 4 bits of the address data for the terminal units is disposed above the switches 82a to 82c. Further, above the address setting switch 83, there are provided a mode selector switch 84 for a pattern setting mode and a usual operational mode, and a set mode switch 85 for the monitor data input and selecting a whole pattern setting or a partial pattern setting. Further disposed above which switches 84 and 85 are light-emission indicators 86a, 86b and 86c respectively associated with the pattern switches 82a, 82b and 82c. Light-emission indicators 86a, 86b, and 86c correspond to the light emitting diodes LD21 and LD22 of FIG. 10 for indicating ON state of one of the pattern switches 82a, 82b and 82c, as well as a set state indicator 86. It will be understood that, with this arrangement, any desired one or ones of the loads can be controlled in a desired pattern.

Figure 3:
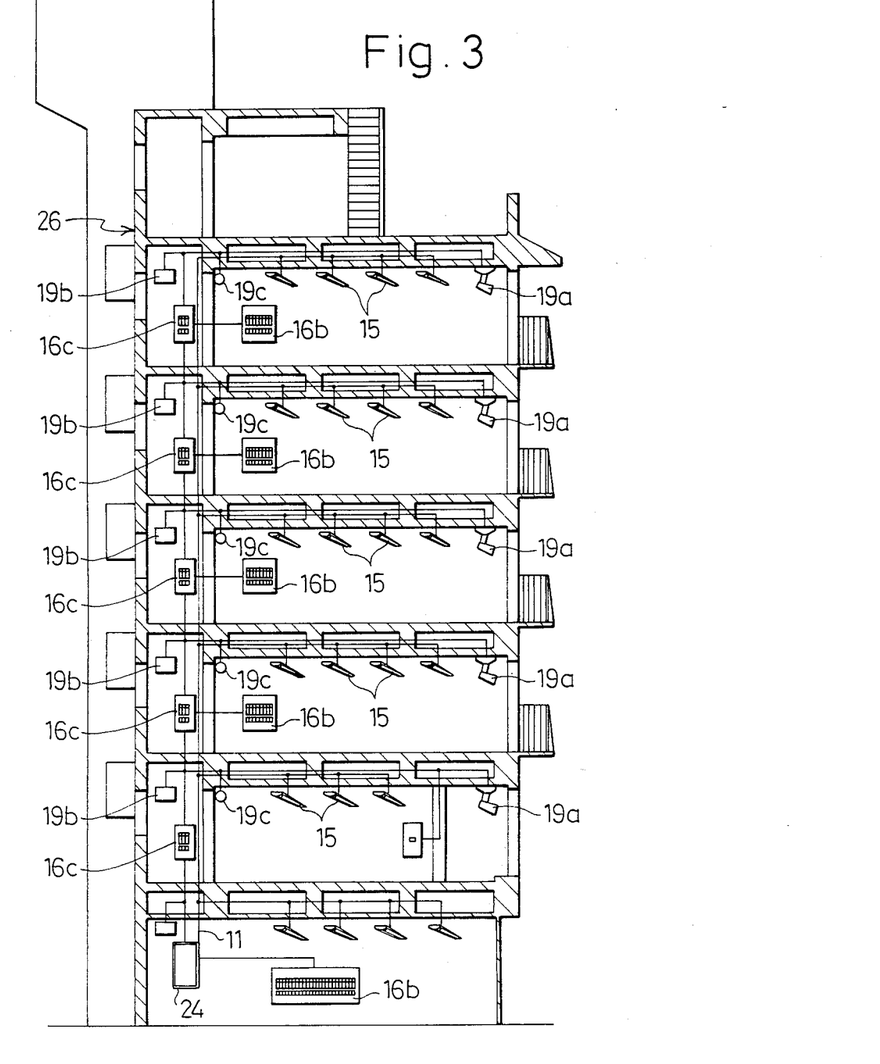
FIG. 3 shows in a schematic sectional view a practical example in which the system of FIG. 1 is applied to a multi-storied building.

The system of FIG. 1 may be effectively used with respect to a multi-storied building such as shown in FIG. 3, in which event the input terminal units are provided on each floor of the building. That is, the operating switches 16a and selector switches 16b connected to the operating terminal units 12 as well as the sunlight sensors 19a, fire sensors 19b and burglar sensors 19c connected to the monitoring terminal units 13 may be provided for the respective building floors as connected to the two-wire line 11 extended from the control panel 25.

Figure 4:
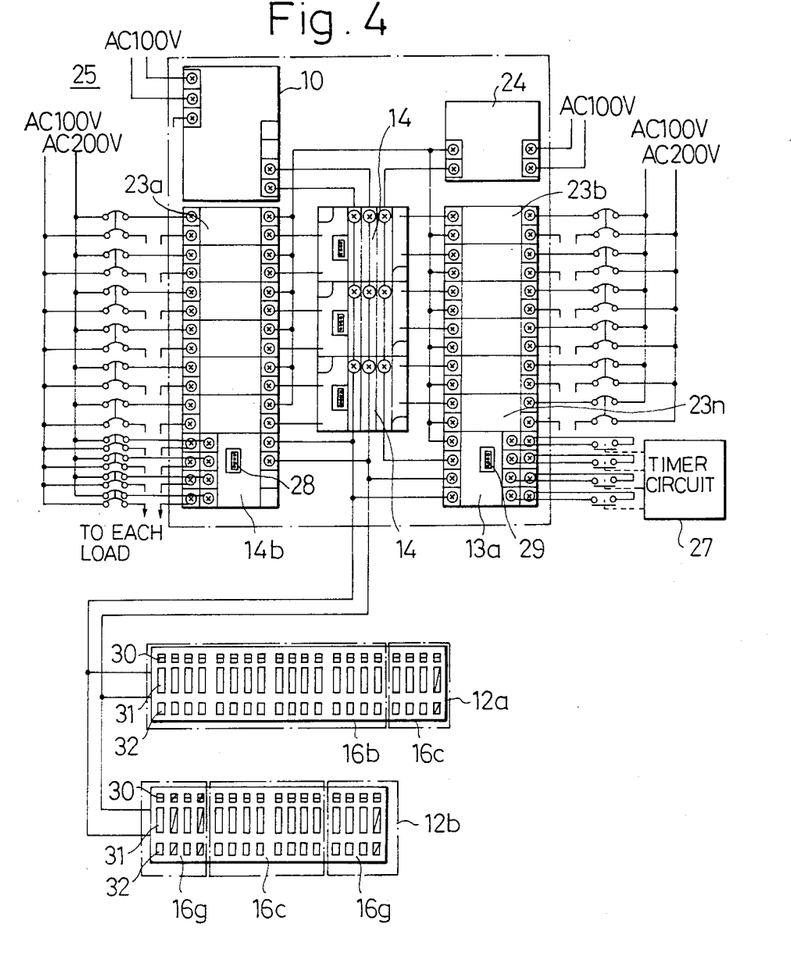
FIG. 4 is a circuit diargram showing details of a control panel including the central control unit and controlling terminal units in the system of FIG. 1, with operating terminal units shown as connected to the panel.
Figure 5:
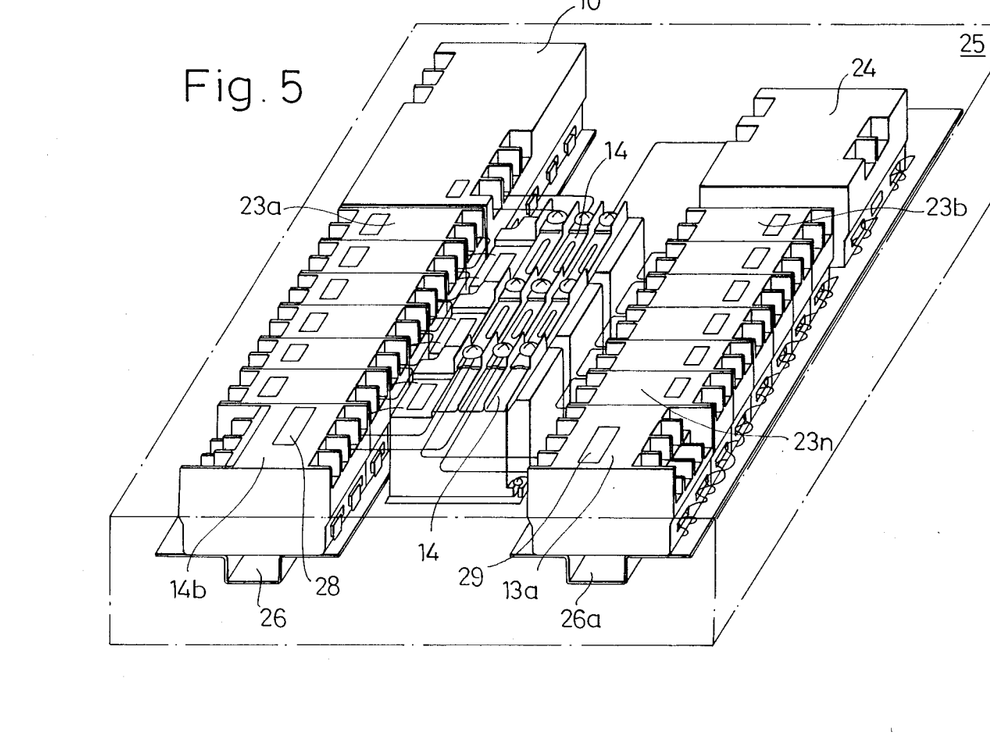
FIG. 5 is a magnified perspective view of the control panel substantially corresponding to that of FIG. 4.

Referring to FIGS. 4 and 5, there is shown an example of mounting array on the control panel 25 of the constituent members in the present system, more in details and practical manner than that shown in FIG. 2. In the array, the central control unit 10, one group of the remote control relays 23 and output controlling terminal unit 14b are mounted on one of a pair of DIN rails 26 and 26a of the control panel 25, whereas the transformer 24, the other group of the relays 23 and monitoring terminal unit 13a for receiving monitoring inputs from no-voltage contacts of a timer circuit 27 are mounted on the other rail, so as to be arranged in two rows. The control terminal units 14 are arranged in a row in a space between the groups of remote control relays 23a, 23b, ... 23n, for their direct control. Attached onto the top sides of the controlling and monitoring terminal units 14b and 13a are switches 28 and 29 for setting their specific addresses. With such array as mentioned above, similarly to the case of other wiring equipment such as electromagnetic relays, circuit breakers and the like, the constituent members are made mountable in the form of modules so as to be easily installed on the control panel 25 together with such other wiring equipments as above.

If required, any other type of operating terminal unit may be connected to the control terminal units. For example, it is possible to employ a terminal unit 12a incorporating a composite input means of integralized selector and pattern switches 16b and 16c, or a terminal unit 12b incorporating an input means of integralized pattern and pattern-setting switches 16c and 16g. In these terminal units 12a and 12b, there are provided ON/OFF displays 30 by means of light emitting diode, operating-pattern nameplates 31 and operating buttons 32.

Figure 6:
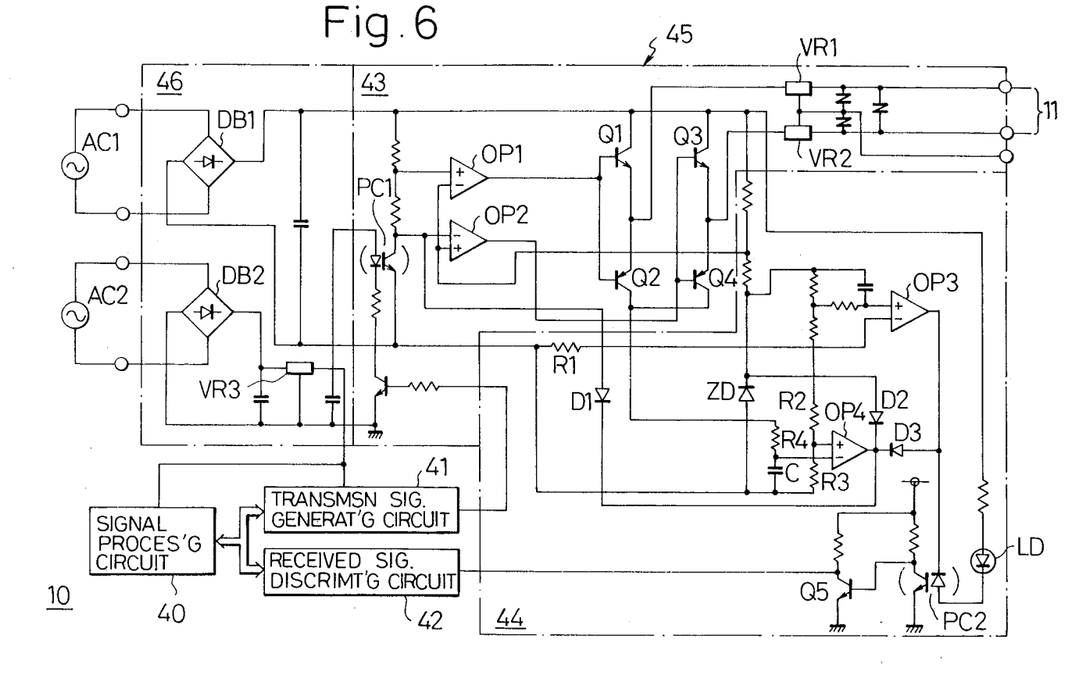
FIG. 6 is an example shown in a circuit diagram of the central control unit in the system of FIG. 1.

Referring to FIG. 6, the central control unit 10 practically comprises a CPU-formed signal processing circuit 40, transmission signal generating and received-signal discriminating circuits 41 and 42 connected to the signal processing circuit 40, a signal sending/receiving circuit 45 including a signal sending circuit 43 and a signal receiving circuit 44, and a power supply circuit 46. The above-described dummy signal transmitting means and interruption processng means are realized here by the signal processing circuit 40, transmission signal generating circuit 41 and received-signal discriminating circuit 42. As partly before described, such dummy transmission signal as shown in FIG. 7a is constantly generated. The signal sending circuit 43 comprises a photo-coupler PC1 for circuit isolation, transistors Q1 to Q4, operational amplifiers OP1 and OP2 and three-terminal regulators VR1 and VR2, so that transistors Q1 and Q4 or Q2 and Q3 turned ON in response to the level "H" or "L" of the pulse-width-modulated data signal emitted from the transmission signal generating part 41 will generate the bipolar transmisson signal Vs of ±25 V, the voltage of which signal is stabilized by the three-terminal regulators VR1 and VR2, and the dummy transmission signal will be provided onto the signal line 11.

On the other hand, the signal receiving circuit 44 comprises a photo-couplerPC2 also for circuit isolation, operational amplifiers OP3 and OP4, diodes D1 to D3, a Zener diode ZD, a light emitting diode LD, a transistor Q5, at least resistors R1 to R4 and capacitor C, so that the return signal sent as the current mode signal from the respective terminal units 12, 13 and 14 through the signal line 11 will be detected by a return signal detecting means consisting of the current detecting resistor R1, Zener diode ZD and operational amplifier OP3. That is, when a voltage across the current detecting resistor R1 through which the signal current flows exceeds a sum value of the terminal voltage of the resistor R1 added to a reference voltage set by the Zener diode ZD, the operational amplifier OP3 has an "L" level output. The light emitting diode LD for operation indicator and a light emitting diode of the photo-coupler PC2 are thereby turned ON, whereby the reception of the return signal is indicated by the light emitting diode LD and the return signal is sent to the received-signal discriminating circuit 42 through the photo-transistor of the photo-coupler PC2 and the transistor Q5. A circuit for detecting any short-circuiting in the signal line 11 is formed by the diode D2 and the operational amplifier OP4. Operational amplifier OP4 comprises a divided voltage of the reference voltage set by the Zener diode ZD as divided by the resistor R2 and R3 with the voltage across the current detecting resistor R1 to which the signal current is sent from a noise eliminating circuit of the resistor R4 and capacitor C. When a large short-circuit current due to the short-circuiting in the signal line 11 causes the voltage across the current detecting resistor R1 to exceed the divided voltage, the output level of the operational amplifier OP4 will be "L" and the light emitting diode LD for operation indication and the light emitting diode of the photo-coupler PC2 will be turned ON while the light emitting diode LD is continously lit, whereby the short-circuit detecting circuit indicates the short-circulating in the signal line 11.

The power supply circuit 46 includes diode bridge circuits DB1 and DB2 and a three-terminal regulator VR3. Power supply circuit 46 functions to smoothly rectify an output of a signal power source AC1 for sending it to the signal sending and receiving circuit 45, and also to smoothly rectify an output of a control power source AC2 to a constant voltage for sending it to the signal processing circuit 40, transmission signal generating circuit 41 and received-signal discriminating circuit 42.

Figure 8:
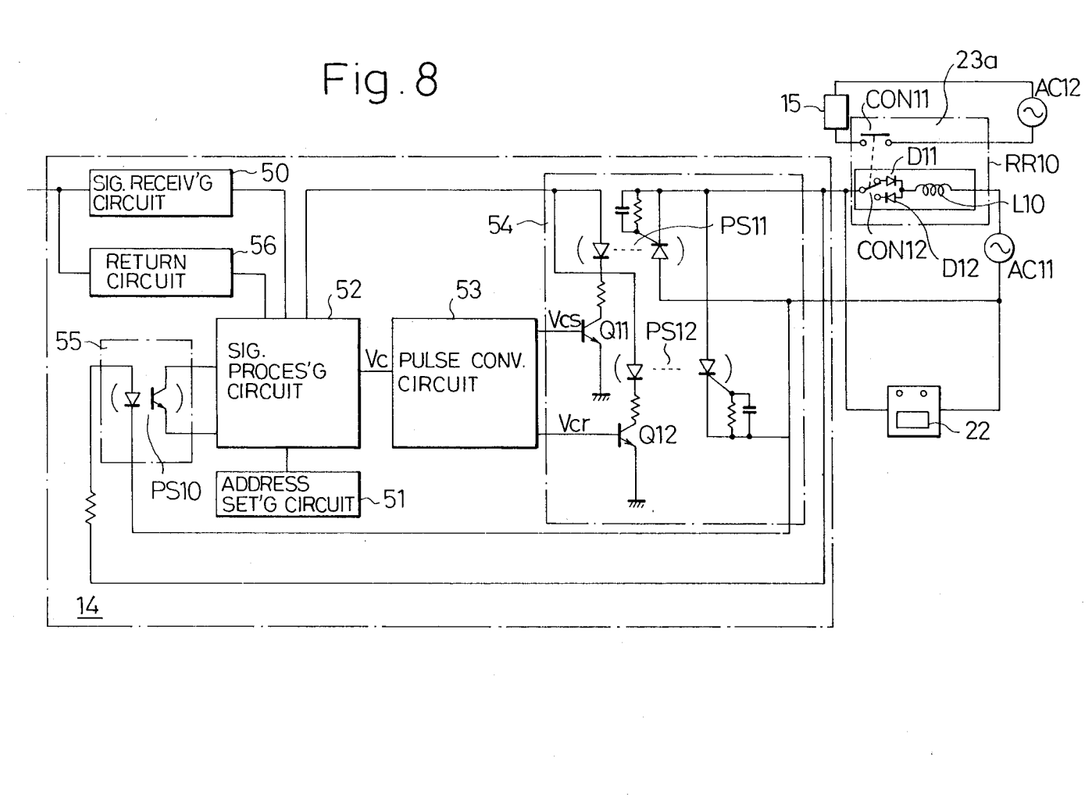
FIG. 8 is a circuit diagram showing an example of the control terminal unit in the system of FIG. 1.

Shown in FIG. 8 is a practical example of the control terminal unit 14, which comprises a circuit for receiving the dummy transmission signal Vs transmitted through the signal line 11 and a circuit 51 for setting a specific address for each terminal unit. Control terminal 14 also comprises a signal processing circuit 52 for detecting the coincidence between the address data signal of the signal Vs and the specific address and, upon such coincidence, taking up the control data signal from the signal Vs to generate a control output Vc. Pulse conversion circuit 53 forms a set pulse signal $V_{CS}$ and a reset pulse signal $V_{CR}$ for the remote control relays 23a, 23b, ... 23n in response to the level "H" or "L" of the control output Vc. Relay driver circuit 54 including transistors Q11 and Q12 and photo-thyristors PS11 and PS12 generates signals driving the relays 23a, 23b, ... 23n. A monitoring input circuit 55 including a photo-coupler PC10 receives monitoring data indicative of the operational state of the relays 23a, 23b, ... 23n. A return circuit 56 returns the monitored data signal as the current mode signal to the central control unit 10 during a return signal period set by the return wait signal WT.

With this arrangement, the control terminal unit 14 is made to take up the transmitted control data signal when the central control unit 10 attempts to access it, so as to geneate the drive signal for the remote control relays 23a, 23b, ... 23n to turn ON and OFF the loads 15 and also return to the central control unit 10 the monitored data signal indicative of the operational state of the relays 23a, 23b, ... 23n.

The monitoring terminal unit 13 is arranged substantially in the same manner as the control terminal unit 14, except that the pulse conversion circuit 53 and relay driver circuit 54 in the control terminal unit 14 are omitted in the monitoring terminal unit 13. Another difference is that the signal processing circuit in the monitoring terminal unit 13 comprises the interruption signal generating and data returning means for sending the interruption signal Vi and returning the monitored data signal upon occurrence of the monitor input.

Figure 9:
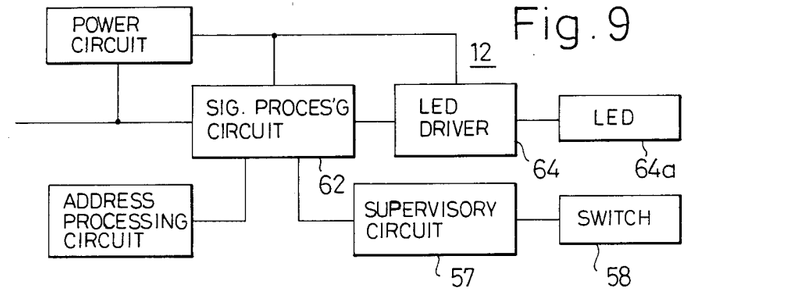
FIG. 9 shows in a block diagram the operating terminal unit in the system of FIG. 1.

As will be clear from a comparison of FIG. 9 with FIG. 8, the operating terminal unit 12 is also substantially of the same arrangement as the control terminal unit 14, except that the pulse conversion circuit 53 in the control terminal unit 14 is omitted and the relay driver circuit 54 is replaced by an LED driver circuit 64 for driving a light emitting diode 64a. Another difference is that a monitoring circuit 57 provides an input data signal in response to an input from such various switches 58 as the dimmer switch 16d and others shown in FIG. 1, which input data signal is sent to a signal processing circuit 62. Signal processing circuit 62 in turn generates a data signal similar to the interruption signal Vi in the monitoring terminal unit 13, the data signal being sent to the central control unit 10.

In setting the specific address for the respective terminal units 12, 13 and 14, an 8 bit address desirably is employed, the lower 6 bits of which are for use by the user and the upper 2 bits of which are for use by the manufacturer. Therefore, the respective addresses for the operating, monitoring and controlling terminal units 12, 13 and 14 are to be so set that, for example, the user-use bits are set to have the same value throughout the units. This establishes the correspondence of each of the operating and monitoring terminal units 12 and 13 to each of the control terminal units 14, whereby the remote control relay corresponding to one of the control terminal units 14 is driven in response to the monitored data returned from one of the operating and monitoring terminal units 12 and 13 of the same bit value and eventually a control of a desired one of the loads 15 is executed. When, for example, the first and second bits of the address data for each of the operating and monitoring terminal units 12 and 13 and for each of the control terminal units 14 as well as fixedly set by the manufacturer to be "0,0" and "0,1", respectively, and the third to eighth bits of the address data are left to be settable by the user, channels 1 to 63 are allocated to the operating and monitoring terminal units 12 and 13 while channels 128 to 191 are allocated to the control terminal units 14. It should be here appreciated that the correspondence between the operating and monitoring terminal units 12, 13 and the control terminal unit 14 in setting the third to eighth bits of their addresses is made 1:1, that is, in the channels, 0→128, 1→129, ... 63→191.

Referring again to FIG. 8, the remote control relay 23a shown to be energizably connected to one of the control terminal units 14 comprises a latching relay RR10 having main and auxiliary contacts CON11 and CON12 operatively interlocked with each other, and current switching diodes D11 and D12 connected in series with an exciting coil L10 of the latching relay PR10. When a set current of a predetermined level is passed through the coil L10 for a predetermined period from the power source AC11 through the transformer 24 (FIG. 1) and diode D11, the main contact CON 11 is placed in its ON position to supply power from the commercial power source AC12 to the load 15, upon which the auxiliary contact CON12 is inversely operated to switchingly connect the diode D12 to the coil L10. A reset current is thus supplied from the AC power source AC11 through the diode D12 to the coil L10, whereby the main contact CON11 breaks to stop the current supply to the load, and the auxiliary contact CON12 is inversely switched to the position in which it is connected to the diode D11.

When the photo-thyristor PS11 included in the relay driver circuit 54 of the control terminal unit 14 is turned ON, the main contact CON11 of the latching relay RR10 in the remote control relay 23a closes to supply power to the load 15, whereas, when the photo-thyristor PS12 is turned on, the main contact CON11 of the latching relay RR10 in the relay 23a opens to interrupt the power supply to the load 15.

As partly described before, the remote control relays are provided to be controlled in parallel relation to one another by the remote control switch 22, and this switch 22 is provided to have substantially the same function as the control terminal unit 14. Referring to FIG. 10, the remote control switch 22 comprises a set/reset circuit 70 including more than one of a switch SW20 and diodes D21 and D22, and an ON/OFF display circuit 71 including light emitting diodes LD21 and LD22 and diodes D23 and D24 respectively connected in series with each of the diodes LD21 and LD22. Accordingly, with the switch SW20 depressed to form a circuit with the diode D21 or D22, a set or reset current can be supplied to the excitating coil L10 of the relay RR10, and the operation can be indicated by the light emitting diode LD21 or LD22.

Figure 12:
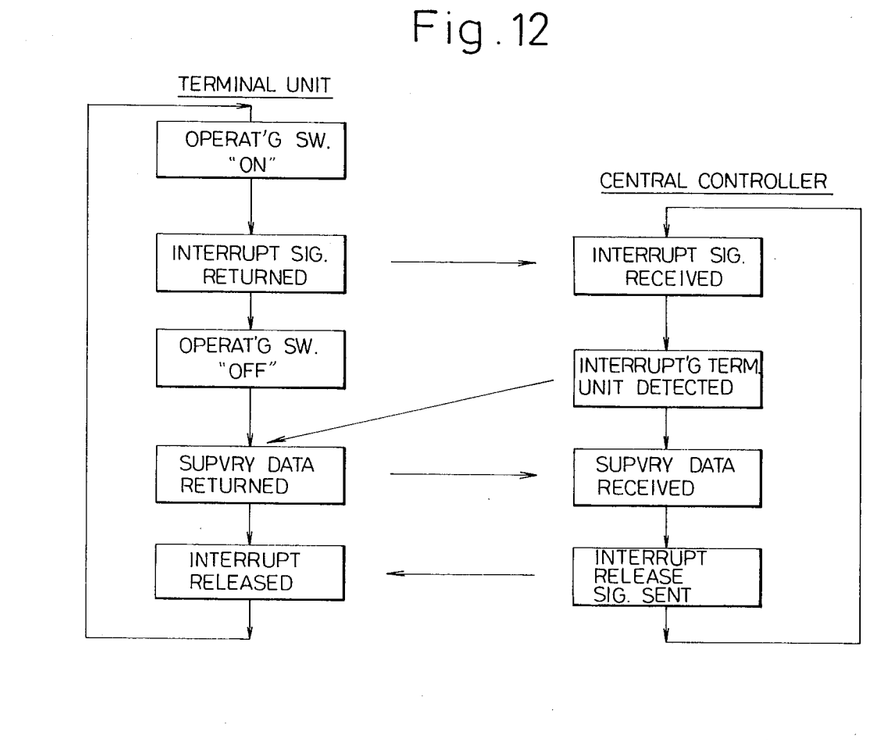
FIG. 12 is a flowchart showing an operational relationship between the central control unit and the operating and monitoring terminal units in the system of FIG. 1.
Figure 13:
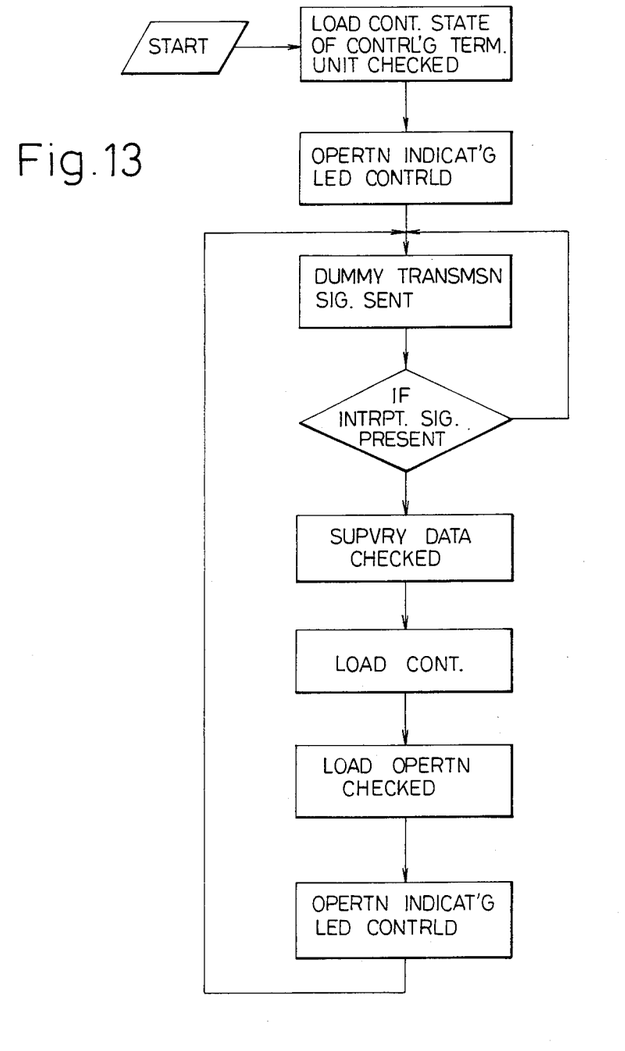
FIG. 13 is a flowchart showing the operation of the central control unit with respect to the operating and monitoring terminal units in the system of FIG. 1.

Next, the operation of the system according to the present invention will be explained in summary with reference to FIGS. 12 to 14. When the system of, for example, FIG. 1 is connected to the power source and the supervising and controlling operation starts, the central control unit 10 initially interrogates the control terminal units 14 to confirm the control state of the loads connected to the units, and then sequential accesses the input terminal units 12 to turn ON or OFF the light emitting diodes respectively connected to the units 12 for indication of their operating state in accordance with the operational state of the corresponding loads 15. That is, if the state of any load is in conformity to the set pattern of the control pattern switch 16c, then the light emitting diode corresponding to such load is lit.

The dummy-signal sending means, comprising the signal processing circuit 40 and others in the central control unit 10, provides onto the signal line 11 and the dummy transmission signal Vs for an access to any idle address other than the specific addresses set for the respective operating, monitoring and controlling terminal units 12, 13 and 14. Since no address coincidence is obtained at any terminal unit during such normal operation in which the dummy transmission signal Vs is constantly provided, no data transmission is performed between the central control unit 10 and the respective terminal units 12, 13 and 14, and the system is on standby. When there occurs an input at the input means of the operating or monitoring terminal unit 12 or 13 or, when, for example, the separate operating switch 16a is actuated and corresponding terminal unit 12 receives an input, the interrupt signal generating means, comprising the signal processing circuit 62 in the operating terminal unit 12, generates the interrupt signal Vi and provides it onto the signal line 11 in synchronism with the start pulse signal ST of the dummy transmission signal Vs.

When the interruption processing means in the central control unit 10 receives the interruption signal Vi from the operating terminal unit 12, the central control unit 10 carries out the access to the terminal units 12 to detect which one of them has provided the interruption signal, and sends to the particular terminal unit 12 detected an address confirmation mode signal for having the address data signal returned from the particular terminal unit 12. Upon receipt of the address confirmation mode signal, the interruption signal generating means in the particular terminal unit 12 returns its specific address data to the central control unit 10 in synchronism with the return wait signal WT of the dummy transmission signal Vs. The address data from the terminal unit is received at the interruption processing means in the central control unit 10, and the transmission signal in interruption access mode is sent from the unit 10 to the particular terminal unit 12 in the input means of which the input has taken place. The data return means in the particular terminal unit 12 responds to this access mode transmission signal received and returns to the central control unit 10 the data corresponding to the input in synchronism with the return wait signal WT of the dummy transmission signal Vs. The input data thus returned from the particular terminal unit 12 to the central control unit 10 is processed by the signal processing circuit 40 and so on to prepare data for controlling one of the loads 15 which corresponds to the particular terminal unit 12 and a transmission signal for an access to one of the control terminal units 14 which corresponds to the particular terminal unit 12.

The control terminal unit 14, having received the transmission signal, controls one of the remote control relays 23a to 23n for ON or OFF control of the corresponding load 15 on the basis of the control data from the central control unit 10, and returns the data indicative of the control state of the load to the control unit 10. The sequential access of the control unit 10 is carried out with respect to the terminal units on the basis of the data returned from the control terminal unit 14 to control the ON and OFF operation of the load-operation-indicating light emitting diodes for renewing their indication according to the operational state of the corresponding load 15, and a series of the monitoring and controlling operation is completed. Thereafter, the central control unit 10 is restored to the standby state of constantly transmitting the dummy transmission signal Vs.

Figure 14:
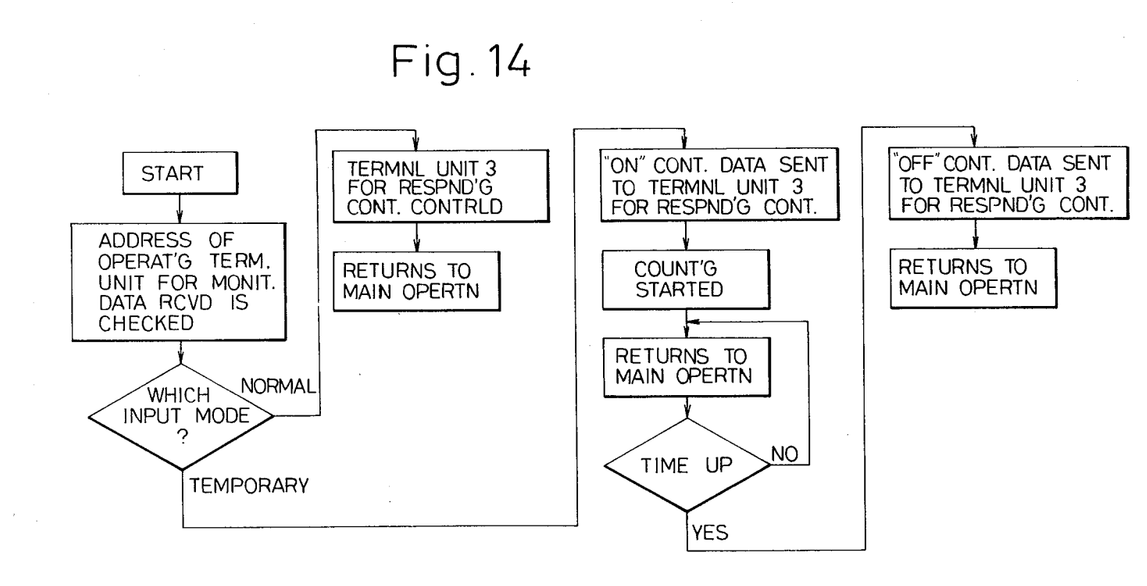
FIG. 14 is a flowchart showing the operation of the central control unit with respect to the operating terminal units in the system of FIG. 1.

If the terminal unit which has provided the interrupt signal is the one that can execute a temporary operation, then the central control unit 10 judges whether the input data from this terminal unit is of the normal mode or the temporary mode and, if the input data is of the normal mode, the central control unit 10 sends the ON or OFF control data to the associated control terminal unit or, if it is of the temporary mode, then the unit 10 sends the ON control data to the corresponding control terminal unit 14, to start counting an interval, and, when the interval has elapsed, to have the OFF control data sent to the unit 14 to energize the corresponding load 15 for a predetermined time, as seen in the flowchart of FIG. 14.

Further, when the central control unit 10 receives inputs from both of the operating and monitoring terminal units 12 and 13 substantially simultaneously, the unit 10 processes first the input data from the monitoring terminal unit 13 preferentially, and this preferential data processing is carried out also upon receipt of the input data from the monitoring terminal unit 13 during the processing of the input data from the operating terminal unit 12. Since the interruption signal Vi from the operating and monitoring terminal units, i.e., input terminal units is always processed prior to any other signal processing, further, the central control unit 10 can rapidly take up the input data signal from any input terminal unit generating the interruption signal. This means that even a significant increase in the number of the input terminal units causes no substantial deterioration in the response of the system. Further, by means of the light emitting diodes connected to the terminal units, the indication of signal reception state, i.e., the ON and OFF indication or the short-circuiting indication for the signal line can be made possible while simplifying indicating arrangement. An additional use of differently colored light emitting diodes emitting, for example, red and green light for the ON or OFF indication, may further improve the display function of the system.

In addition, the remote supervisory and controlling system of the present invention may be modified in various ways. For example, the signal processing circuit 40 in the central control unit 10 may be provided with a memory means for storing the system programs of the processing circuit 40, corresponding address relationships between the input terminal units 12, 13 and the control terminal units 14, data processing sequence, temporarily-held data and so on, as will be readily appreciated by those skilled in the art. For the signal discrimination in the central control unit 10, a clock generator may be advantageously employed particularly when time counting is effected by means of the control data for the control terminal units 14 to control them in accordance with thereby counted time. Also, when the signal processing circuit 62 of the operating terminal unit 12 is provided so as to receive an output of an input mode setting circuit to which the input to the input mode switch is provided for discriminating the input data of the separate operating switch 16a from that of the temporary lighting switch 16e, system responsiveness can be improved even further. The monitoring terminal units 13 may be operatively connected to their corresponding monitor input means not by means of wire connection but through a wireless transmitting and receiving means.

Further, when the loads 15 are lighting equipment and a plurality of such dimmer switches 16d as shown in FIG. 1 are provided as the input means of the monitoring circuit 57 in the operating terminal unit 12, the system can realize not only the ON and OFF operation of the lighting equipment but also various degrees of light intensity therebetween. In this case, it will be readily understood that, when the control terminal unit 14 corresponding to the foregoing operating terminal unit 12 is provided with a triode AC switch (TRIAC) and its triggering circuit and the signal processing circuit 62 is arranged for varying the time constant of this triggering circuit and eventually the phase control angle of the TRIAC, the light intensity control of the lighting equipment can be selected as freely as desired by varying the phase control angle, and various illumination effects can be realized.

What is claimed is:

1. A remote supervisory and controlling system comprising:
    a central control unit operable in any one of a normal mode, an address confirmation mode, and an access mode, and including means for continuously generating a time multiplex divisional dummy signal containing a start pulse signal, an address data signal, and a return wait signal when said control unit is operating in said normal mode; and
    a plurality of input terminal units electrically connected to said central control unit, each input terminal unit including:
        means, responsive to said dummy signal, for generating a time multiplex divisional input data signal in synchronism with said return wait signal when an address indicated by said address data signal corresponds to a preset address of the input terminal unit;
        means for generating an interrupt signal indicative of an interrupt condition and for sending said interrupt signal to said control unit in synchronism with said start signal;
        means for generating and sending to said control unit a specific address signal in response to an address confirmation mode signal; and
        means for generating and sending to said control unit said input data signal in response to an access mode transmission signal;
    said control unit being adapted to operate temporarily in an address confirmation mode in response to receipt of said interrupt signal, and including means for generating said address confirmation mode signal when said control unit is operating in said address confirmation mode, and to operate temporarily in an access mode in response to receipt of said specific address signal and including means for generating said access mode transmission signal when said control unit operates in said access mode.

2. A system as claimed in claim 1, further comprising a plurality of control terminal units electrically connected to said central control units, each control terminal including means, responsive to said dummy signal, for causing an associated load to operate in accordance with said central data signal when an address indicated by said address data signal corresponds to a preset address of the central terminal.

3. A system according to claim 1, wherein said central control unit further includes timer means for counting a predetermined time to control said loads according to counted time, in response to said input data.

4. A system according to claim 1, wherein said loads comprise lighting equipment, said input terminal units include a dimming terminal unit for providing lighting ON and OFF data as well as dimming data of said lighting equipment in response to predetermined data, and said central control unit includes memory means for storing lighting ON and OFF control data as well as dimming control data for the lighting equipment in response to a predetermined input data.

5. A system according to claim 1, wherein said input terminal units include a pattern input terminal unit for preparing an input data for controlling said loads in unit groups, said pattern input terminal unit being provided with a mode selector switch which provides to said central control unit a selection data between a mode for setting the loads belonging to each unit group and their operation and a mode of normally controlling the loads.

* * * * *